Patented Dec. 9, 1941

2,265,814

UNITED STATES PATENT OFFICE 2,265,814

MANUFACTURE OF DERIVATIVES OF UNSATURATED ACIDS

Patrick D. Ritchie, Hebburn-on-Tyne, England, and David Trevor Jones and Robert Burns, Saltcoats, Scotland, assignors to Imperial Chemical Industries Limited, a corporation of Great Britain No Drawing. Original application August 2, 1934, Serial No. 738,160, now Patent No. 2,183,357, dated December 12, 1939. Divided and this application September 20, 1939, Serial No. 295,754. In Great Britain August 3, 1933

14 Claims. (Cl. 260—464)

This invention relates to improvements in the production of derivatives of unsaturated acids, particularly the esters and nitriles of such acids. This application is a division of our United States Patent 2,183,357, of December 12, 1939.

It is known that unsaturated compounds may be produced by the dehydration of mono-carboxylic hydroxy acids or their esters, or by the elimination of hydrogen halides from esters of halogen-substituted monocarboxylic acids. It is also known that unsaturated acids may be formed by the elimination of acetic acid from acetylated derivatives of poly-carboxylic acids. For example, aconitic ester may be prepared by simple distillation of acetylated citric ester; and maleic anhydride similarly by distillation of acetylated malic anhydride. Difficulty has been experienced, however, in producing alpha-beta-unsaturated derivatives from the esters of alpha-hydroxy mono-carboxylic acids or the corresponding nitriles by direct removal of the elements of water. For example, it is possible to convert acetone cyanohydrin into alpha-methyl acrylic nitrile by treatment with phosphorus pentoxide; but the method is not well suited for technical adoption.

According to the present invention, lower alkyl esters or nitriles of alpha-beta-unsaturated monocarboxylic aliphatic acids are produced by subjecting in the vapor form to temperatures considerably in excess of their boiling points, esters, nitriles, or amides of mono- or di-alkyl glycolic acids in which the hydrogen atom of the alpha-hydroxyl group (i. e. alcoholic) has been replaced by the acidic radical of an acid which is volatile, or of which the decomposition products are volatile, at the said temperature, the said substituted glycolic acids may be illustrated by the formula:

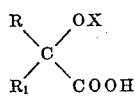

where R is an alkyl radical, R₁ is hydrogen or an alkyl radical and X is a radical of an acid which is volatile at the temperature of the reaction. In carrying out the invention atmospheric pressures may be used. The optimum temperature for the reaction varies somewhat according to the particular derivative undergoing decomposition; but in general it is preferred to employ temperatures between about 400° and 600° C.

The heat treatment is conveniently carried out by passing the vapor of the substance through a heated tube, if desired, together with an inert diluent gas or vapor such as nitrogen or carbon dioxide. The tube may be suitably packed, for example, with quartz, to increase the heating surface; and packing materials known for their catalytic effect, such as silica gel or graphite, may also be used.

Among the compounds which may be employed there may be mentioned those derivatives of mono- and di-alkyl glycolic esters, nitriles, or amides in which the hydrogen atom of the alcoholic hydroxyl group has been replaced by the acidic radicals of mono-basic acids such as acetic acid, or by the acidic radicals of di-basic acid such as sulfurous acid, sulfuric acid, or phthalic acid. The corresponding symmetrical carbonates and unsymmetrical alkyl carbonates of the mono- or di-alkyl substituted glycolic esters, nitriles, and amides, which may be regarded as derived by replacement of the hydrogen atom of the alcoholic hydroxyl group by the acidic radical of the hypothetical carbonic acid or methyl hydrogen carbonate, respectively, may also be used. In the case of the mono-basic acid radical derivatives, to which class the unsymmetrical alkyl carbonate derivatives may be said to belong, each molecule of the derivative yields up to 1 molecule of the unsaturated compound as a result of its thermal decomposition, and each molecule of the symmetrical di-basic acid derivatives, to which class the symmetrical carbonate belongs, also yields up to 1 molecule only of the unsaturated derivative. In the case of the acetyl derivative, acetic acid is formed as the other product of the reaction; in the case of the methyl carbonate derivative the other products which may be recovered are carbon dioxide and methyl alcohol, while in the case of the normal carbonate there may be recovered carbon dioxide and a mono- or di-alkyl glycolic acid derivative.

As a guide to the methods whereby the derivatives which are used according to our invention may be produced, the mono- or di-alkyl glycolic acid derivatives form a convenient source of supply. In general these may be converted into the mono-basic acid derivatives with the aid of an acid chloride or an acid anhydride in the usual manner, into the symmetrical carbonates with the aid of phosgene, or into the unsymmetrical methyl carbonate with the aid of methyl chloroformate, while the symmetrical or unsymmetrical sulfites may similarly be obtained by treatment with thionyl chloride or methyl chlorosulfite, advantageously in the presence of an organic base as acid acceptor in each case where hydrogen chloride is a product of the reaction.

When the available raw material is the monoalkyl glycolic acid derivative, it is preferred to convert it into the acetate or the methyl carbonate, but in the case of the di-alkyl glycolic acid derivatives the yield of the methyl carbonate or methyl sulfite is usually too low to render this an attractive method; and it is therefore preferred to convert into the acetate.

Of the esters which may be used according to our invention, the methyl esters give better yields of the corresponding unsaturated esters than the ethyl or higher molecular weight esters, which as the molecular weight increases tend to undergo pyrolytic decomposition with the formation of an unsaturated hydrocarbon and the corresponding acid. When the derivative used according to our invention is an amide, the product obtained is a nitrile.

It will be understood that the rate at which the derivatives used according to our invention can be supplied will depend not only on the temperature, but also upon the dimensions of the apparatus which is used, which in general takes the form of a vessel of tubular shape provided with means for keeping it at a substantially steady temperature.

When applied to the amide, nitrile, or lower alkyl ester (in which not more than 4 carbon atoms are present in the ester group) of a monocarboxylic acid derivative, and particularly of an acetyl derivative of lactic acid or its alpha-methyl or alpha-ethyl homologues, it provides a particularly advantageous method for preparing the corresponding unsaturated nitrile or ester.

We have indicated that the material used in the invention may be prepared from the mono- or di-alkyl glycolic acid derivatives. Thus when acetone-cyanhydrin is acetylated, for instance, by the method described by Henry, Bull. Acad. Roy. Belg., 1898 (3), 36, 22, there may be produced alpha acetoxy-iso-butyronitrile and N-acetyl alpha-acetoxy-iso-butyramide, both of which materials when treated according to our invention yield methacrylic nitrile.

The invention is further illustrated by the following examples:

*Example 1.*—287 grams alpha-acetoxyisobutyro-nitrile were allowed to run at the rate of 5 grams per minute into a vertical iron tube 40 inches long and of internal diameter 1 inch, packed with approximately ½ inch mesh quartz chips and surrounded with an electric furnace jacket by which its internal temperature was maintained at 425 to 435° C., as indicated by a platinum iridium element located in the middle of the tube, which was also provided with a condenser. The passage of the vapor through the hot tube was facilitated by a slow current of dry carbon dioxide.

284 grams of condensate were obtained, which on careful fractionation at ordinary pressure yielded 27 grams of the unchanged nitrile and 132 grams of methacrylic nitrile boiling at 90–96° C. This represents a yield of 95% on the nitrile decomposed in the reaction. The recovered nitrile was added to the next batch treated.

*Example 2.*—437 grams methyl alpha-acetoxyisobutyrate, obtained by acetylating methyl alpha-hydroxyisobutyrate, were allowed to run at the rate of 5–6 grams per minute into a vertical iron tube as used in Example 1 maintained at a temperature of 480–500° C., 428 grams of a liquid were condensed and on fractional distillation in a gentle current of nitrogen yielded 253 grams of methyl methacrylate boiling at 96–106° C., representing a yield of 92% on the ester used. Methyl alpha-acetoxyisobutyrate is a liquid boiling at 169–171° at 750 mm. pressure and at 78–79° at 20 mm. pressure.

*Example 3.*—51 grams N-acetyl alpha-acetoxyisobutramide were dissolved in 130 grams of acetone and the solution was slowly run into the apparatus as described in Example 1, which was maintained at an internal temperature of 520–530° C. On fractionating the condensate 14 grams crude methacrylic nitrile were obtained along with 25 grams acetic acid and 120 grams of acetone. On redistillation of the crude nitrile 12.5 grams of the practically pure substances were obtained, representing a yield of 65% on the amide used. The N-acetyl alpha-acetoxyisobutramide was obtained as a residue after distilling away under reduced pressure the alpha acetoxyisobutyro-nitrile formed along with it on treatment at 100° C., of acetone-cyanhydrin with 10% more than the theoretical amount of the acetic anhydride in the presence of a trace of perchloric acid as catalyst. Its melting point is 81–82° C.

*Example 4.*—113 grams of alpha-acetoxypropionitrile were run slowly into an apparatus as described in Example 1, the temperature of the tube being kept between 540°–550° C. The product (108 grams) yielded on careful fractionation 72 grams of unchanged alpha-acetoxypropionitrile and 18 grams of acrylic nitrile, corresponding to a yield of 95% based on the alpha-acetoxy propionitrile destroyed.

*Example 5.*—327 grams methyl alpha-acetoxypropionate, prepared by the action of acetic anhydride upon methyl lactate, were pyrolysed at 470–485° C., in the apparatus described in Example 1. The product (313 grams) yielded on careful fractionation, 68 grams of unchanged ester and 134 grams of methyl acrylate, representing 88% of the theoretical yield based on the quantity of ester actually destroyed.

*Example 6.*—126 grams of ethyl alpha-acetoxypropionate were pyrolysed at a temperature of 450° C., at a rate of 5 grams per minute in the apparatus described in Example 1. The product (119 grams) gave on careful fractionation 100 grams of unchanged ester and 10.5 grams of ethyl acrylate, being 76% of the theoretical yield based on the quantity of ester actually destroyed.

*Example 7.*—Methyl alpha-benzoyloxyisobutyrate was prepared by the interaction of equimolecular proportions of benzoyl chloride, pyridine, and methyl alpha-hydroxyisobutyrate, followed by extraction with ether and fractionation of the extract. This substance bo'ls at 124° at 4 mm., and about 209°–210° at 760 mm. 108 grams of the product were pyrolysed at a temperature of 410–420° C., at a rate of 4 grams per minute in the apparatus used in Example 1. 100 grams of a pasty yellow semi-solid mass were obtained. On solution in ether, removal of benzoic acid (42 grams) with aqueous sodium carbonate solution, and fractionation of the ether extract, 27 grams of unchanged ester and 28 grams of methyl methacrylate were obtained, being 77% of the theoretical yield based on the quantity of ester destroyed.

*Example 8.*—162 grams of a mixture of crude di-(alpha-carboethoxy-ethyl) sulphite with about an equal weight of lactide and other impurities were pyrolysed at 385°–420°. Sulfur dioxide was evolved, and the product on fractionation gave 15 grams of ethyl acrylate and 17 grams of ethyl lactate.

*Example 9.*—Di-(alpha - carbomethoxy - isopropyl) carbonate was prepared by passing carbonyl chloride into a vigorously stirred mixture of 480 grams methyl alpha-hydroxyisobutyrate and 320 grams pyridine until 245 parts of the gas had been absorbed. After being heated at 100° for an hour, the product was shaken with water, extracted with ether, and distilled under reduced pressure. 191.5 grams of methyl alpha-chloroisobutyrate and 246 grams of di-(alpha-carbomethoxy-isopropyl) carbonate were obtained. The latter compound, which has not hitherto been described, melts at 66°–67° and boils at 192°–194° at 15 mm.

227 grams of the di-(alpha-carbomethoxy-isopropyl) carbonate were dissolved in 150 grams of acetone and pyrolysed at 445–455° C., in a slow current of carbon dioxide at a rate of 6 grams per minute in the apparatus used in Example 1. The product on fractionation yielded 73 grams of methyl methacrylate and 42 grams of methyl alpha-hydroxy isobutyrate. No unchanged ester was recovered.

*Example 10.*—Di-(alpha-cyano-isopropyl) carbonate was prepared by treating acetone cyanohydrin with carbonyl chloride and pyridine as described in Example 9. The product, which has not hitherto been described, melts at 76°–77° C. 98 grams of the carbonate were dissolved in 146 grams of acetone, and the solution pyrolysed at 430°–450° C., in a slow current of carbon dioxide at a rate of 3.5 grams per minute in the apparatus used in Example 1. The product on fractionation yielded 18 grams methacrylic nitrile.

*Example 11.*—Di-(alpha-carbomethoxy-ethyl) carbonate was prepared by treating methyl lactate with carbonyl chloride and pyridine as described in Example 9. This substance, which has not hitherto been described, boils at 172° at 32 mm.

99 grams of di-(alpha-carbomethoxy-ethyl) carbonate were pyrolysed at 420° C. Careful fractionation of the product (81 grams) yielded 10 grams methyl acrylate, 12 grams methyl lactate and 46 grams unchanged carbonate.

*Example 12.*—Di-(alpha-cyano-ethyl) carbonate was prepared by treating acetaldehyde cyanohydrin with carbonyl chloride and pyridine as described in Example 9. This substance, which has not hitherto been described, melts at 44.5°–45° C., and boils at 165°–168° C., at 16 mm.

224 grams of di-(alpha-cyano-ethyl) carbonate were dissolved in 148 grams of acetone, and the solution was pyrolysed at 460°–480° C., at a rate of 4 grams per minute in the apparatus used in Example 1. The product yielded on fractionation 56 grams of unchanged carbonate and 40 grams of acrylic nitrile.

*Example 13.*—Methyl (alpha-carbomethoxyethyl) carbonate was prepared by gradually adding 210 grams of methyl chloroformate to a vigorously stirred mixture of 208 grams of methyl lactate and 160 grams of pyridine. After being heated at 100° C., the product was shaken with water, extracted with ether, and distilled under reduced pressure. This substance boils at 198°–200° at 759 mm.; 97°–98° at 18 mm.; 91.5°–92° at 12 mm.

128 grams of methyl (alpha-carbomethoxyethyl) carbonate were pyrolysed at 550°–570° C., at a rate of 4 grams per minute in the apparatus used in Example 1. The product (86 grams) gave on fractionation 13 grams of unchanged carbonate and 40.5 grams of methyl acrylate, being 67% of the theoretical yield.

*Example 14.*—Methyl (alpha-cyano-ethyl) carbonate was prepared by treating acetaldehyde cyanohydrin with methyl chloroformate and pyridine as described in Example 13. This substance, which has not hitherto been described, boils at 92° at 22 mm., 82°–83° at 13 mm., 80.5° at 10 mm.

42 grams of methyl (alphacyanoethyl) carbonate were pyrolysed at 550°–570°. The product (25 grams) gave on fractionation 9 grams of unchanged carbonate and 9 grams of acrylic nitrile, being 66% of the theoretical yield.

*Example 15.*—β-methoxy-ethyl α-hydroxyisobutyrate was prepared by treating acetone cyanhydrin at 80°–100° C. with the monomethyl ether of ethylene glycol in the presence of concentrated sulfuric acid. The fraction of the product boiling at 80°–100° C. at 20 mm. was acetylated to give β-methoxyethyl α-acetoxyisobutyrate, which boils at 105° C. at 12 mm. pressure.

200 grams of β-methoxyethyl α-acetoxyisobutyrate were pyrolysed at the rate of 2 gm./min. in the apparatus used in Example 1 at 450° C. The recovered product (192 gm.) yielded on fractionation 107 gm. of methoxyethyl methacrylate, B. P. 88°–89° C./20 mm. On warming with 0.5% of its weight of benzoyl peroxide, the product formed a transparent solid polymer.

*Example 16.*—Methyl (α-carboethoxy ethyl) phthalate having a boiling point of 140° at 3 mms. pressure was prepared by boiling equivalent proportions of ethyl lactate and methyl hydrogen phthalate in an equal volume of benzene to which 0.5% concentrated sulfuric acid had been added, the boiling being continued until no more water was evolved.

140 gms. of the methyl (α-carboethoxy ethyl) phthalate were subjected to pyrolysis at 550° C. in the apparatus described in Example 1, the rate of passage through the hot tube being 2.5 gms. per minute. The pyrolysis product condensed to a pasty mass. The solid portion was filtered off and washed several times with successive small amounts of ether. The solid material was shown to be phthalic anhydride and amounted to 35 gms. The filtrate and ether washings were combined and fractionated. The ether which distilled off first had an odor of acetaldehyde and the presence of this substance was proved by preparation of the 2:4-di-nitrophenyl hydrazone.

The fraction 50°–160° C., amounting to 25 gms. was further fractionated and gave 5 gms. of methyl alcohol and 18 gms. of a fraction 101°–105° C. which polymerized in the presence of 0.5% benzoyl peroxide.

25 gms. uncracked ester were recovered. Total loss 41 gms. The yield of ethyl acrylate amounted to about 40% of that theoretically possible.

The materials treated by the process of the present invention are broadly the lower alkyl esters, nitriles or amides of substituted glycolic acids represented by the formula:

where R is an alkyl radical, R₁ is hydrogen or an alkyl radical and X is the radical of an acid which is either volatile itself at the temperature of the reaction or which yields decomposition products volatile at the said temperature. These derivatives, i. e., the esters, nitriles or amides may be conveniently prepared from the corresponding α-hydroxy derivatives with the aid, for example, of an acid chloride or an acid anhydride in the manner already described. They may, however, also be prepared in any other known or suitable manner, as for example by the treatment of the corresponding α-halogenated derivative with sodium acetate. The invention consists broadly in the pyrolysis of the substituted glycolic acid derivatives described above and independently of their method of production.

Having now particularly described and ascertained the nature of our said invention, and in what manner the same is to be performed, we declare that what we claim is:

1. A method of producing derivatives of alpha-beta-unsaturated monocarboxylic aliphatic acids which comprises pyrolyzing a compound having the empirical formula $$CH_3-\underset{X}{\underset{|}{C}}-Y$$
$$\phantom{CH_3-}|\phantom{-Y}$$
$$\phantom{CH_3-}OH$$

in which X is a radical selected from the group consisting of hydrogen, alkyl and alkoxy groups and Y is a radical of the group consisting of cyano, carbamyl and lower carboalkoxy radicals, the hydrogen atom of the alcoholic hydroxyl group having been replaced by a radical of an inorganic acid, the decomposition products of which are volatile.

2. A method as claimed in claim 1 wherein the temperature employed is between 400 and 600° C.

3. A method of producing lower alkyl esters of alpha-beta-unsaturated monocarboxylic acids as claimed in claim 1 wherein the acid derivative pyrolyzed is an amide which is subsequently converted to an ester.

4. A method of producing lower alkyl esters of alpha-beta-unsaturated monocarboxylic acids as claimed in claim 1 wherein the acid derivative pyrolyzed is a nitrile which is subsequently converted to an ester.

5. A method for producing nitriles of alpha-beta-unsubstituted monocarboxylic acids as claimed in claim 1, wherein the acid derivative pyrolyzed is a nitrile.

6. A method as claimed in claim 1 wherein the hydrogen of the alcoholic hydroxyl group of the compound pyrolyzed has been replaced by the acidic radical of a dibasic inorganic acid.

7. A method as claimed in claim 1, wherein the hydrogen of the alcoholic hydroxyl group of the compound pyrolyzed has been replaced by the acidic radical of sulfurous acid.

8. A method as claimed in claim 1 wherein the compound pyrolyzed is di-(alpha-carboethoxy-ethyl) sulphite.

9. A method of producing derivatives of alpha-unsaturated monocarboxylic aliphatic acids which comprises pyrolyzing a compound having the empirical formula:

$$CH_3.CH(OH).Y$$

in which Y is a radical selected from the group consisting of cyano, carbamyl, and lower carboalkoxy radicals, the hydrogen atom of the alcoholic hydroxyl group having been replaced by a radical of an inorganic acid, the decomposition products of which are volatile.

10. A method of producing derivatives of alpha-unsaturated monocarboxylic aliphatic acids which comprises pyrolyzing a compound having the chemical formula:

$$CH_3.CH(OH).Y$$

in which Y is a radical selected from the group consisting of cyano, carbamyl, and lower carboalkoxy radicals, the hydrogen atom of the alcoholic hydroxyl group having been replaced by the acidic radical of a dibasic inorganic acid.

11. A method of producing derivatives of beta-unsaturated monocarboxylic aliphatic acids which comprises pyrolyzing the compound having the chemical formula:

$$(CH_3)_2.C(OH).Y$$

in which Y is a radical selected from the group consisting of cyano, carbamyl and lower carboalkoxy radicals, the hydrogen of the alcoholic hydroxyl group having been replaced by a radical of an inorganic acid, the decomposition products of which are volatile.

12. A method of producing derivatives of beta-unsaturated monocarboxylic aliphatic acids which comprises pyrolyzing the compound having the chemical formula:

$$(CH_3)_2.C(OH).Y$$

in which Y is a radical selected from the group consisting of cyano, carbamyl and lower carboalkoxy radicals, the hydrogen of the alcoholic hydroxyl group having been replaced by the acidic radical of a dibasic inorganic acid.

13. A method of producing an alkyl acrylate which compries pyrolyzing at a temperature between 400 and 600° C. a di-(alpha-carboalkoxy ethyl) sulphite.

14. A method of producing ethyl acrylate which comprises pyrolyzing at a temperature between 385° and 420° C. di-(alpha-carboethoxy-ethyl) sulphite.

PATRICK D. RITCHIE.
DAVID TREVOR JONES.
ROBERT BURNS.